(12) United States Patent
Ma

(10) Patent No.: US 8,806,608 B2
(45) Date of Patent: Aug. 12, 2014

(54) AUTHENTICATION SERVER AND METHOD FOR CONTROLLING MOBILE COMMUNICATION TERMINAL ACCESS TO VIRTUAL PRIVATE NETWORK

(75) Inventor: Jingwang Ma, Shenzhen (CN)

(73) Assignee: ZTE Corporation, Shenzhen, Guangdon Province (CN)

( * ) Notice: Subject to any disclaimer, the term of this patent is extended or adjusted under 35 U.S.C. 154(b) by 470 days.

(21) Appl. No.: 13/003,096

(22) PCT Filed: Jul. 6, 2009

(86) PCT No.: PCT/CN2009/072636
§ 371 (c)(1),
(2), (4) Date: Apr. 1, 2011

(87) PCT Pub. No.: WO2010/003354
PCT Pub. Date: Jan. 14, 2010

(65) Prior Publication Data
US 2012/0110658 A1 May 3, 2012

(30) Foreign Application Priority Data
Jul. 9, 2008 (CN) .......................... 2008 1 0116419

(51) Int. Cl.
*H04L 29/06* (2006.01)
*G06F 17/00* (2006.01)
(52) U.S. Cl.
USPC .......... 726/15; 726/4; 726/6; 726/3; 713/151; 713/155; 713/188
(58) Field of Classification Search
USPC ............................. 370/235, 338; 726/4, 6, 15
See application file for complete search history.

(56) References Cited

U.S. PATENT DOCUMENTS

2006/0130135 A1* 6/2006 Krstulich et al. ............... 726/15
2008/0189773 A1* 8/2008 Maiorano et al. ................ 726/5
2010/0306827 A1* 12/2010 Balducci et al. ................. 726/4

FOREIGN PATENT DOCUMENTS

CN 101309272 A 11/2002
CN 1662092 A 8/2005
(Continued)

OTHER PUBLICATIONS http://documentation.netgear.com/fvs336g/enu/202-10257-01/pdfs/VPN.pdf "Virtual Private Networking Using IPsec"—Oct. 2007 Netgear.*

(Continued)

*Primary Examiner* — Randy Scott
(74) *Attorney, Agent, or Firm* — McGarry Bair PC

(57) ABSTRACT

The present invention discloses an authentication server and a method for controlling a mobile communication terminal access to a virtual private network (VPN). The authentication server comprises a first store module configured to store a first characteristic information of the mobile communication terminal allowed to access; a receiving module configured to receive a VPN access requesting message from the terminal to access; a judgment module configured to judge the type of the terminal to access and obtain a judgment result; a information acquisition module configured to obtain a second characteristic information of the terminal to access when the judgment result indicates that the terminal to access is a mobile communication terminal; a first comparison module configured to compare the second characteristic information with the first characteristic information and obtain a first comparison result; a first execution module configured to allow the terminal to access to continuatively perform the access process when the first comparison result indicates that the second characteristic information is identical with one piece of characteristic information in the first characteristic information, otherwise refuse the terminal to access to continuatively perform the access process. The present invention can effectively ensure the security of the mobile VPN.

10 Claims, 2 Drawing Sheets

(56) References Cited

FOREIGN PATENT DOCUMENTS

| CN | 100493247 | C |   | 8/2005 |
|----|-----------|---|---|--------|
| CN | 1738240   | A |   | 2/2006 |
| CN | 101043755 | A | * | 9/2007 |
| CN | 101102188 | A | * | 1/2008 |
| CN | 101151849 | A | * | 3/2008 |
| CN | 101309272 | A | * | 11/2008 |
| KR | 20070038618 | A |  | 4/2007 |

OTHER PUBLICATIONS http://www.strongswan.org/docs/LinuxTag2007-strongSwan.pdf
"The new IKEv2 VPN Solution"—Andrea Steffan, Strong Swan, Apr. 2007.*

* cited by examiner

AUTHENTICATION SERVER AND METHOD FOR CONTROLLING MOBILE COMMUNICATION TERMINAL ACCESS TO VIRTUAL PRIVATE NETWORK

CROSS-REFERENCE TO RELATED APPLICATIONS

This application is a National Phase application of International Application No. PCT/CN2009/072636, filed Jul. 6, 2009, which claims the benefit of Chinese Patent Application No. 200810116419.8, filed Jul. 9, 2008, both of which are incorporated herein by reference in their entirety.

FIELD OF THE INVENTION

The present invention relates to the technical field of the safety control of a virtual private network, and more particularly it relates to an authentication server and a method for controlling a mobile communication terminal access to a virtual private network.

BACKGROUND OF THE INVENTION

VPN (virtual private network) refers to the technology of establishing private data communication network in a public network. In the VPN, the connection between any two nodes is constituted dynamically by using the resources of a certain public network. The VPN can realize the interconnection between the resources and components of different networks, can create a tunnel for the user by using the infrastructure of Internet or other public internets, and provide a safety and function guarantee as same as the private network.

Mobile VPN service is the VPN service realized through the mobile communication network, and can provide a mobile, safe and high quality data channel for the institutions such as enterprises and so on, so that the user can access to the resources of the institutions at any time and any place.

As same as the requirements of fixed network VPN, the mobile VPN also requires network security, performance optimization, and easy management. The security can be realized by means of tunnel encryption, data verification, user verification, fire wall and attack detection and so on; the realization of the performance optimization requires that the existing resources and capacity of the network are fully utilized and the quality of service (QoS) demand of various data services is met as much as possible by a traffic prediction and control strategy and the distribution of the bandwidth resource according to priority; the easy management is embodied as realizing the divisional management of the enterprises and operators on the VPN according to the different demands of the enterprises, and ensuring the VPN has good expansibility, economy and safe reliability.

Tunneling technology is a key factor for establishing the VPN. The existing tunnel protocols mainly comprise a layer-two tunnel protocol (such as layer 2 tunnel protocol L2TP) and a layer-three tunnel protocol (such as general-purpose routing encapsulation GRE, IPSec, multi-protocol label switching MPLS etc.). It is the capacity of the mobile network devices for supporting the above tunnel protocols to be used by the mobile VPN to perform VPN networking, so as to realize the VPN services of the mobile network.

Different from the fixed network VPN, the user uses the mobile communication terminals such as mobile phone, network card and so on to access the resources of the private network of the institutions such as enterprises and so on. The mobile communication terminal can access the resources of the private network at any time and any place. However, along with the conveniences brought about, the difficulties with terminal management are produced as well, such as the use state of the terminal is uncontrollable; the terminal may be lost or be stolen during use; the risk exists that some unauthorized users may use the mobile communication terminal to access the resources of the private network and so on, all of which affect the security of the private network. Therefore, in the technical solution of the mobile VPN, it is desired to propose a corresponding solution for solving the security problems of the mobile communication terminal.

SUMMARY OF THE PRESENT INVENTION

The present invention is directed to solving the security problems brought about by the mobile communication terminal in mobile VPN technology. For this reason, the present invention mainly aims to provide an authentication server and a method for controlling the mobile communication terminal access to the virtual private network, so as to solve at least one of the above-mentioned problems.

In order to realize the above-mentioned objects, there is provided an authentication server according to one aspect of embodiments of the present invention.

The authentication server according to embodiments of the present invention comprises: a first store module configured to store the first characteristic information of the mobile communication terminal allowed to access; a receiving module configured to receive a VPN access requesting message; a judgment module configured to judge the type of the terminal to be accessed and obtain a judgment result; a information acquisition module configured to obtain the second characteristic information of the terminal to access when the judgment result indicates that the terminal to access is a mobile communication terminal; a first comparison module configured to compare the second characteristic information with the first characteristic information and obtain a first comparison result; a first execution module configured to allow the terminal to access to continuatively perform the access process when the first comparison result indicates that the second characteristic information is identical with one piece of characteristic information in the first characteristic information, otherwise refuse the terminal to access to continuatively perform the access process.

Preferably, the above authentication server further comprises: a second store module configured to store the third characteristic information of the mobile communication terminal which is not allowed to access; a second comparison module configured to, when the first execution module refuses the terminal to access to continuatively perform the access process, compare the second characteristic information with the third characteristic information and obtain a second comparison result; and a second execution module configured to send the instruction for deleting VPN configuration information to the terminal to be access, when the second comparison result indicates that the second characteristic information is identical with one piece of characteristic information in the third characteristic information.

Preferably, the second characteristic information is international mobile equipment identity.

Preferably, the above authentication server further comprises a management module which is configured to manage the first characteristic information and the third characteristic information stored in the first store module and the second store module, for management operation.

Preferably, when the VPN access requesting message is from gateway GRPS support nodes, the judgment result indicates that the terminal to access is a mobile communication terminal.

In order to realize the above-mentioned objects, there is provided a method for controlling the mobile communication terminal access to the virtual private network according to another aspect of embodiments of the present invention.

The method for controlling the mobile communication terminal access to the virtual private network according to the present invention comprises: receiving the VPN access requesting message; judging the type of a terminal to access and obtaining a judgment result; obtaining the second characteristic information of the terminal to access when the judgment result indicates that the terminal to access is a mobile communication terminal: comparing the second characteristic information with the first characteristic information and obtaining a first comparison result, wherein the first characteristic information is the aggregate of the characteristic information of the mobile communication terminal allowed to access; and allowing the terminal to access to continuatively perform the access process when the first comparison result indicates that the second characteristic information is identical with one piece of characteristic information in the first characteristic information, otherwise refusing the terminal to access to continuatively perform the access process.

Preferably, the above method further comprises: comparing the second characteristic information with the third characteristic information when the terminal to access is refused to continuatively perform the access process, and obtain a second comparison result, wherein the third characteristic information is the aggregate of the characteristic information of the mobile communication terminal which is not allowed to access; and sending the instruction for deleting VPN configuration information to the terminal to access when the second comparison result indicates that the second characteristic information is identical with one piece of characteristic information in the third characteristic information.

Preferably, the second characteristic information is international mobile equipment identity.

Preferably, when the VPN access requesting message is from gateway GRPS support nodes, the judgment result indicates that the terminal to access is a mobile communication terminal.

With the present invention, the identification of the mobile communication terminal which requests to access the VPN is authenticated. For the mobile communication terminal which is not allowed to access the VPN, the authentication server interacts with the terminal and then deletes the VPN configuration resident on the terminal, to prevent the terminal from accessing the VPN again. Solving the security problems caused by the mobile communication terminal in mobile VPN technology can effectively ensure the security of the mobile VPN.

Other characteristics and advantages of the present invention will be described in the following specification, and will be apparent partly from the specification and embodiments of the present invention. The objects and other advantages can be realized and obtained through the structure particularly proposed in the specification, claims, and the drawings.

DETAILED DESCRIPTION

General Description of Functions

In the technical solution provided by the embodiments of the present invention, after judging that the VPN access requesting message is from the mobile communication terminal, the authentication server interacts with and then authenticates the mobile communication terminal. Only the mobile communication terminal which passes the authentication can access the VPN and then to execute subsequent operations. For the mobile communication terminal which is not allowed to access the VPN, the authentication server will interact with the terminal and then delete the VPN configuration resident on the terminal to prevent the terminal from accessing the VPN again. The solution solves the security problems caused by the mobile communication terminal in mobile VPN technology, and can effectively ensure the security of the mobile VPN.

Figure 1:
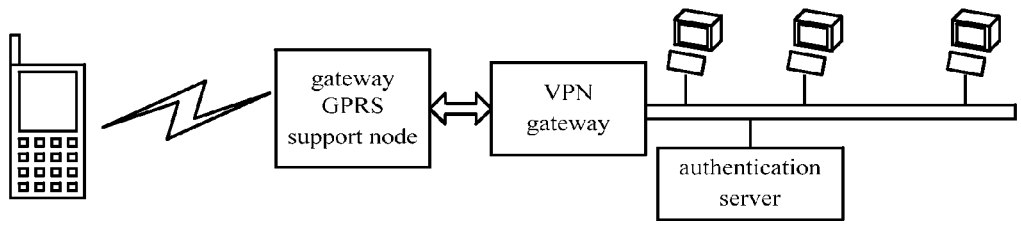
FIG. 1 is a structural schematic diagram of the application environment according to an embodiment of the present invention.

For the purpose of better understanding the present invention, prior to describing the authentication server and the method for controlling the mobile communication terminal access to the virtual private network according to the embodiments of the present invention in detail, the application environment of the authentication server and the method for controlling the mobile communication terminal access to the virtual private network according to the embodiments of the present invention will be explained firstly The device and method of the embodiments of the present invention need the support of a mobile VPN access system. As shown in FIG. 1, the mobile VPN access system in the embodiments of the present invention comprises a mobile communication terminal, a mobile communication network, and a private network of the institution such as enterprise and so on.

The mobile communication terminal has the function for supporting mobile data service and VPN access, and can realize VPN connection through the inbuilt VPN access software.

The mobile communication network can be the third generation communication network. The gateway GPRS support node (GGSN) device in core network can realize the access of the mobile VPN to the private network of institution such as enterprise and so on. The private network of institution such as enterprise and no on comprises a VPN gateway, an authentication server, and the other nodes in the private network (such as the computers as shown in FIG. 1).

The preferable embodiments of the present invention will be detailed hereinafter in connection with the drawings. It should be understood that the preferable embodiments detailed hereafter are given by way of illustration only, and thus are not limitative of the present invention. If un-conflictive, the embodiments of the present invention and the characteristics in the embodiments can be inter-combined with each other.

Embodiments of the Device

There is provided an authentication server according to the embodiment of the present invention.

Figure 2:
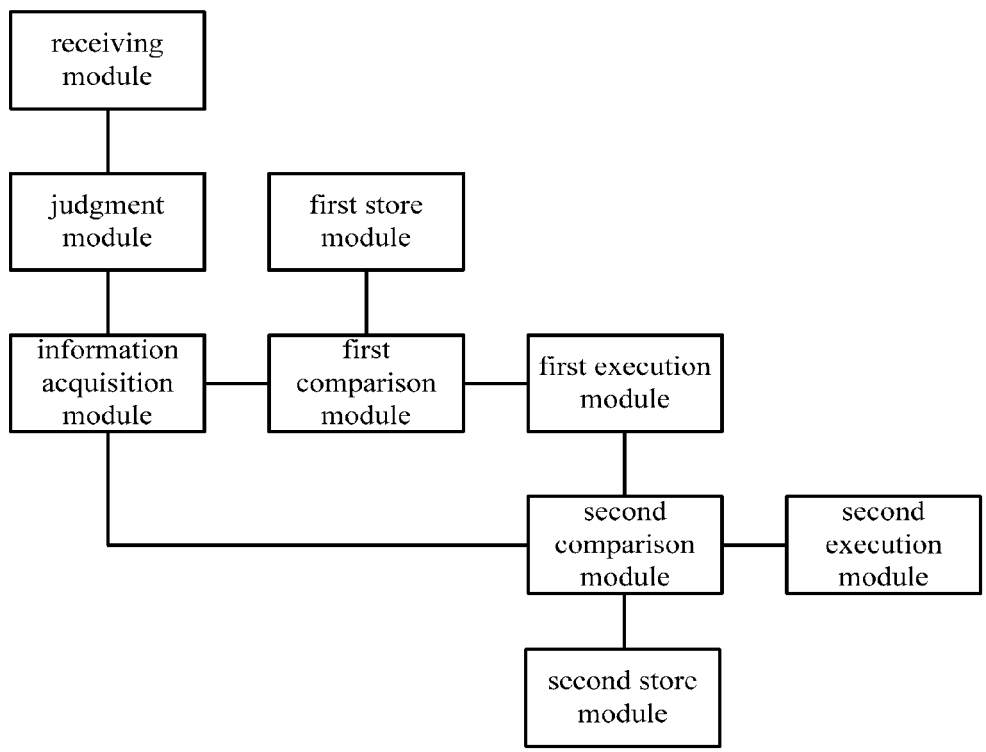
FIG. 2 is a structural schematic diagram of the authentication server according to an embodiment of the present invention.

As shown in FIG. 2, the authentication server comprises:

a first store module, which is configured to store the first characteristic information of the mobile communication terminal allowed to access;

a receiving module, which is configured to receive a VPN access requesting message;

a judgment module, which is configured to judge the type of a terminal to access according to the source where the VPN access requesting message is from and then obtain a judgment result;

an information acquisition module, which is configured to interact with the terminal to access when the above judgment result indicates that the terminal to access is a mobile communication terminal, and obtain the second characteristic information of the terminal to access;

a first comparison module, which is configured to compare the second characteristic information with the first characteristic information and obtain a first comparison result;

a first execution module, which is configured to allow the terminal to access to continuatively perform the access process when the above first comparison result indicates that the second characteristic information is identical with one piece of characteristic information in the first characteristic information, otherwise refuse the terminal to access to continuatively perform the access process.

In the above-mentioned device, when judging that the second characteristic information of the mobile communication terminal to access is different from all the characteristic information in the first characteristic information, it is refused for the terminal to access to continuatively perform the access process. However, generally speaking, the mobile communication terminal to access, which is not in the allowable range, further includes two situations as follows:

The first situation where the characteristic information of the mobile communication terminal to access is included in the third characteristic information, wherein the third characteristic information is the aggregate of the characteristic information of the mobile communication terminal which is definitely not allowed to access, and in other words, the mobile communication terminal to access is definitely forbidden to access the VPN;

The second situation where the characteristic information of the mobile communication terminal to access is included neither in the first characteristic information nor in the third characteristic information and in other words, the mobile communication terminal to access is not definitely allowed to access the VPN, or definitely forbidden to access the VPN.

In the authentication server according to the embodiment of the present invention, the above-mentioned two situations need to be treated separately, so that the data security can be ensured as much as possible.

In the above-mentioned situations, as shown in FIG. 2, the authentication server according to the embodiment of the present invention further comprises:

a second store module which is configured to store the third characteristic information of the mobile communication terminal which is not allowed to access (for example, the mobile communication terminal which the user has registered loss or whose service the user has expressly denoted not to use);

a second comparison module which is configured to compare the second characteristic information with the third characteristic information when the above first execution module refuses the terminal to access to continuatively perform the access process, and obtain a second comparison result; and a second execution module which is configured to send a instruction for deleting VPN configuration information to the terminal to access when the above second comparison result indicates that the second characteristic information is identical with one piece of characteristic information in the third characteristic information, and the terminal to access, after receiving the instruction for deleting VPN configuration information, deletes the VPN configuration information.

Embodiments of the Method

Figure 3:
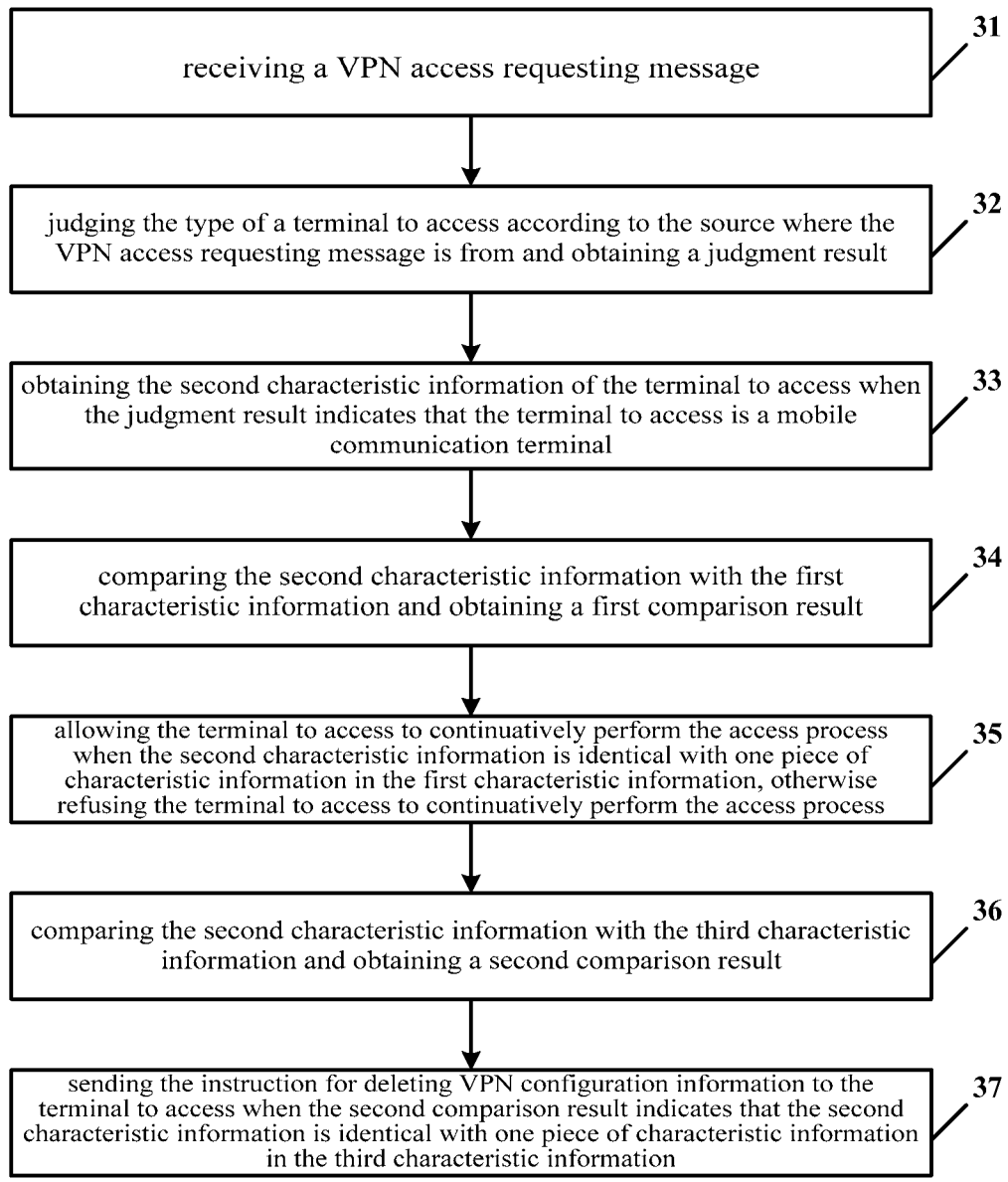
FIG. 3 is a flow schematic diagram of the method according to an embodiment of the present invention.

FIG. 3 is a schematic diagram of the method for controlling the mobile communication terminal access to the virtual private network according to the embodiment of the present invention. As shown in FIG. 3, the method comprises step 31-step 37:

Step 31, receiving a VPN access requesting message:

Step 32, judging the type of a terminal to access according to the source where the VPN access requesting message is from, and obtaining a judgment result;

Step 33, obtaining the second characteristic information of the terminal to access when the above judgment result indicates that the terminal to access is a mobile communication terminal;

Step 34, comparing the second characteristic information with the first characteristic information and obtaining a first comparison result, wherein the first characteristic information is the aggregate of the characteristic information of the mobile communication terminal allowed to access;

Step 35, allowing the terminal to access to continuatively perform the access process when the above first comparison result indicates that the second characteristic information is identical with one piece of characteristic information in the first characteristic information, otherwise refusing the terminal to access to continuatively perform the access process;

Step 36, comparing the second characteristic information with the third characteristic information and obtaining a second comparison result, wherein the above third characteristic information is the aggregate of the characteristic information of the mobile communication terminal which is not allowed to access; and Step 37, sending an instruction for deleting VPN configuration information to the terminal to access when the above second comparison result indicates that the second characteristic information is identical with one piece of characteristic information in the third characteristic information.

After receiving the instruction for deleting VPN configuration information, the terminal to access deletes the VPN configuration information, wherein the VPN configuration information can comprise the IP address of the VPN gateway, pre-shared cipher key, algorithm strategy and so on. Through deleting the VPN configuration information, the present invention can improve the security of the VPN configuration information, and ensure that the mobile communication terminal can not access the private network any more, so that the security is further enhanced.

Wherein, the access process continuatively performed by the terminal to access comprises VPN user verification, VPN tunnel establishment and the other access processes, which has corresponding technical specifications in the VPN technical specification and is unnecessary to be described here any more.

It should be appreciated that before the terminal to access sends the VPN access requesting message to the authentication server, both parties can negotiate the communication encryption according to the VPN technical specification, to ensure the security of data communication. The negotiation of the communication encryption belongs to existing VPN technical specification, so it is unnecessary to be described here any more.

There is further provided a computer readable medium according to the embodiment of the present invention. The computer readable medium is configured to store computer executable instructions. When the instructions are executed by the computer, or a processor, it causes the computer or the processor to execute step 31-step 37 as shown in FIG. 3.

The above-mentioned device and method will be further detailed hereafter.

As seen in above-mentioned description, with the device and method according to the embodiment of the present invention, the mobile communication terminal access to the VPN is controlled, in which the authentication server needs to know whether the terminal requesting to access the VPN is a mobile communication terminal or a fixed device. In the embodiment of the present invention, the type of the terminal to access is judged according to the source where the VPN access requesting message is from, wherein when the VPN access requesting message is from the GGSN of the mobile communication network, it is judged that the terminal to access is a mobile communication terminal, and the subsequent processing flow is executed; and when the VPN access requesting message is not from the GGSN of the mobile communication network, the conventional processing mode is applied, which has been detailed in existing VPN specification, so it is unnecessary to described in detail here any more.

After judging the terminal to access is a mobile communication terminal, the identity of the mobile communication terminal needs to be authenticated. As described above, the characteristic information of the mobile communication terminal is used for authentication, wherein the characteristic information may be any information which can uniquely identify the mobile communication terminal. In the embodiment of the present invention, the international mobile equipment identity (IMEI) of the mobile communication terminal is used for identity authentication. However it should be understood that the IMEI which is used herein as the information to identify the mobile terminal is given only by way of detailed description to the present invention, and thus is not limitative of the present invention.

The IMEI of the mobile communication terminal which is allowed to access and the IMEI of the mobile communication terminal which is not allowed to access are stored in a database.

Of course, the storable data shall be alterable by the administrator. Therefore, the authentication server according to the embodiment of the present invention further comprises:

a management module which is configured to manage the first characteristic information and the third characteristic information stored in the first store module and the second store module, wherein the management operation comprises one or more of the following operations:

deleting operation, in which if the mobile communication terminal of the user is lost, the administrator should remove the characteristic information of the mobile communication terminal of the user from the first characteristic information;

adding operation, in which if the mobile communication terminal of the user is lost, the administrator should add the characteristic information of the mobile communication terminal of the user into the third characteristic information; and look-up operation.

Of course, the management operation also can comprise modifying operation and so on, such as modifying the characteristic information which is typed in by mistake.

After judging the terminal to access is a mobile communication terminal, the second characteristic information of the terminal to access needs to be obtained whose process will be detailed hereafter, comprises step A1-step A3:

Step A1, the VPN authentication server sending a message for requesting identity authentication to the terminal to access;

Step A2, the terminal to access sending an identity authentication request responding message to the VPN authentication server, wherein the identity authentication request responding message includes the IMEI; and Step A3, the authentication server parsing the identity authentication request responding message and obtaining the IMEI included in the identity authentication request responding message.

In the above step A2, after receiving the identity authentication request responding message from the VPN authentication server, the mobile communication terminal reads its IMEI and then packages the IMEI into the identity authentication request responding message, and sends it to the authentication server of the private network.

Obviously, those skilled in the art shall understand that the above-mentioned modules and steps of the present invention can be realized by using general purpose calculating device, can be integrated into one single calculating device or distributed on a network which consists of a plurality of calculating devices. Alternatively, they can be realized by using the executable program code of the calculating device and consequently, can be stored in the storage device and executed by the calculating device. Or they are made into integrated circuit modules respectively, or a plurality of modules or steps thereof are made into one single integrated circuit module. In this way, the present invention is not restricted to any particular combination of hardware and software.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the scope of protection of the present invention.

The invention claimed is:

1. An authentication server, comprising a non-transitory computer readable medium configured to store computer executable instructions, and a processor configured to execute the computer executable instructions in the following modules:

a first store module, to store a first characteristic information of a mobile communication terminal allowed to access;

a receiving module, to receive a virtual private network (VPN) access requesting message from a terminal to access;

a judgment module, connected to the receiving module, to judge the type of the terminal to access and obtain a judgment result;

an information acquisition module, connected to the judgment module, to obtain a second characteristic information of the terminal to access when the judgment result indicates that the terminal to access is a mobile communication terminal;

a first comparison module, connected to the first store module and the information acquisition module, to compare the second characteristic information with the first characteristic information and obtain a first comparison result;

a first execution module, connected to the first comparison module, to allow the terminal to access to continuatively perform an access process, when the first comparison result indicates that the second characteristic information is identical with one piece of characteristic information in the first characteristic information, otherwise refuse the terminal to access to continuatively perform the access process;

a second store module, connected to a second comparison module, to store a third characteristic information of the mobile communication terminal which is not allowed to access;

the second comparison module, connected to the information acquisition module and the first execution module, to compare the second characteristic information with the third characteristic information when the first execution module refuses the terminal to access to continuatively perform the access process, and obtain a second comparison result; and a second execution module, connected to the second comparison module, to send an instruction for deleting VPN configuration information to the terminal to access when the second comparison result indicates that the second characteristic information is identical with one piece of characteristic information in the third characteristic information.

2. The authentication server according to claim 1, wherein the second characteristic information is international mobile equipment identity.

3. The authentication server according to claim 1, wherein the authentication server further comprises:

a management module, connected to the first store module and the second store module, to manage the first characteristic information and the third characteristic information stored in the first store module and the second store module.

4. The authentication server according to claim 1, wherein when the VPN access requesting message is from gateway GRPS support node, the judgment result indicates that the terminal to access is a mobile communication terminal.

5. The authentication server according to claim 1, wherein the second characteristic information is international mobile equipment identity.

6. A method for controlling a mobile communication terminal access to a virtual private network, implemented by an authentication server, comprising:

receiving a VPN access requesting message from a terminal to access;

judging the type of the terminal to access and obtaining a judgment result;

obtaining a second characteristic information of the terminal to access when the judgment result indicates that the terminal to access is a mobile communication terminal;

comparing the second characteristic information with a first characteristic information which is the aggregate of the characteristic information of the mobile communication terminal allowed to access, and obtain a first comparison result;

allowing the terminal to access to continuatively perform an access process when the first comparison result indicates that the second characteristic information is identical with one piece of characteristic information in the first characteristic information, otherwise refusing the terminal to access to continuatively perform the access process;

comparing the second characteristic information with a third characteristic information which is the aggregate of the characteristic information of the mobile communication terminal not allowed to access, when the terminal to access is refused to continuatively perform the access process, and obtaining a second comparison result; and sending an instruction for deleting VPN configuration information to the terminal to access when the second comparison result indicates that the second characteristic information is identical with one piece of characteristic information in the third characteristic information.

7. The method according to claim 6, wherein the second characteristic information is international mobile equipment identity.

8. The method according to claim 6, wherein when the VPN access requesting message is from gateway GPRS support node, the judgment result indicates that the terminal to access is a mobile communication terminal.

9. The method according to claim 6, wherein the second characteristic information is international mobile equipment identity.

10. The method according to claim 6, wherein when the VPN access requesting message is from gateway GPRS support node, the judgment result indicates that the terminal to access is a mobile communication terminal.

* * * * *